United States Patent [19]
Alter et al.

[11] Patent Number: 5,471,713
[45] Date of Patent: Dec. 5, 1995

[54] CORD RETAINING AND FASTENING DEVICE

[76] Inventors: Allan Alter, 5020 Labrosse, Pierrefonds, Quebec, Canada; Paul Goldwerd, 6133 Jericho TPK, Commock, N.Y. 11725

[21] Appl. No.: 216,430
[22] Filed: Mar. 23, 1994
[51] Int. Cl.[6] .................................................. A43C 7/00
[52] U.S. Cl. ...................................... 24/136 R; 24/712.5
[58] Field of Search ........................... 24/115 M, 136 R, 24/115 G, 136 L, 712.5; 403/211, 374

[56] References Cited

U.S. PATENT DOCUMENTS

| | | |
|---|---|---|
| 307,806 | 11/1884 | Sailor et al. . |
| 1,457,029 | 5/1923 | Hazlett et al. .......................... 24/136 R |
| 2,164,123 | 6/1939 | Rio . |
| 4,288,891 | 9/1981 | Boden .................................... 24/115 G |
| 4,665,590 | 5/1987 | Udelhofen et al. . |
| 4,788,755 | 12/1988 | Kasai . |
| 4,807,333 | 2/1989 | Boden .................................... 24/712.5 |
| 4,878,269 | 11/1989 | Anscher et al. ...................... 24/115 G |

Primary Examiner—James R. Brittain

[57] ABSTRACT

A cord retaining and fastening device having a housing with opposed passages through which two cord sections are disposed. A clamping element is removably secured in the housing between at least converging open sections of the passages and is biased towards converging open sections of the passages to clamp one or both of the cord sections when the cord sections are pulled in the biasing direction of the clamping element. When the cords are pulled from the passages, in an opposed direction to the biasing direction, they are free to move out of their respective passages.

14 Claims, 3 Drawing Sheets 5,471,713

CORD RETAINING AND FASTENING DEVICE

TECHNICAL FIELD

The present invention relates to a cord retaining and fastening device and wherein a clamping element is removably secured in a housing to permit the placement of two cord-like sections in respective passages in the housing and for clamping retention thereof. The clamping element is provided with resilient biasing means to urge same in a clamping direction when the cord sections are pulled in the said direction and to permit free movement of the cords within their respective passages when the cord-like elements are pulled in an opposed direction.

The cord retaining and fastening device of the present invention has a multitude of uses and can be used, as for example only, for the retention and fastening of shoe laces, or used as a support device for supporting various objects, such as wires, or could be used as a tie-down pulley to secure ropes to tie down various elements, such as to secure a tent, to secure skis, or to secure a boat, etc.

BACKGROUND ART

Various cord tightening or fastening devices are known, such as disclosed, for example, in U.S. Pat. Nos. 307,806; 2,164,123; 4,665,590 and 4,788,755. The devices disclosed in these patents utilize a housing wherein passage means are delineated for the passage of rope sections. A wedging element is secured to the housing and disposed between the passages and displaceable to wedge the rope sections in their passages when the ropes are pulled in a predetermined direction. The basic principle of the construction of such fastening device is illustrated by the sample design of U.S. Pat. No. 307,806 and, as can be seen, the wedging element is spring-biased against rope sections passing through a housing to grip the rope sections within channels when the ropes are pulled in the biasing direction. When the ropes are pulled in the opposite direction, the wedging element is displaced against a spring force, thereby releasing its engagement with the rope sections.

The present invention relates to an improved type of such fastening device to releasably secure rope-like elements.

A disadvantage of the prior art devices is that in order to engage the rope sections with the fastener, it is necessary to thread the ends of the ropes through channels or passages formed in the fastener housing. These channels are slightly larger than the cross-section of the ropes and this poses difficulty when the ends of the ropes are fibrillated. The threading thus becomes very difficult and often impossible without having to cut a section of rope. Another disadvantage of such fasteners is that the rope wedging element is secured within the housing and causes obstructions to the placement of the rope end sections within the channels. Another disadvantage is that these fasteners are difficult to separate and repair, have limited uses, and some of these are expensive to construct.

SUMMARY OF INVENTION

It is therefore a feature of the present invention to provide a cord retaining and fastening device which substantially overcomes the above disadvantages of the prior art and which constitutes an improvement thereover.

According to the above features, from a broad aspect, the present invention provides a cord retaining and fastening device which comprises a housing having opposed passage means provided with an inlet and outlet for the passage of two cord sections. A clamping element is removably secured in the housing between at least converging open sections of the opposed passage means. Resilient biasing means is secured to the clamping element for urging same in a direction towards the inlet and the converging open sections of the passage means. Means is also provided to removably secure the resilient biasing means in the housing. One or both of the cord sections, when pulled towards the inlet, causes the clamping element to wedge the one or both cord sections between a peripheral portion of the clamping element and a portion of the passage associated with the one or both cord sections. The clamping element permits the one or both cord sections to be freely pulled from the outlet of the passages.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
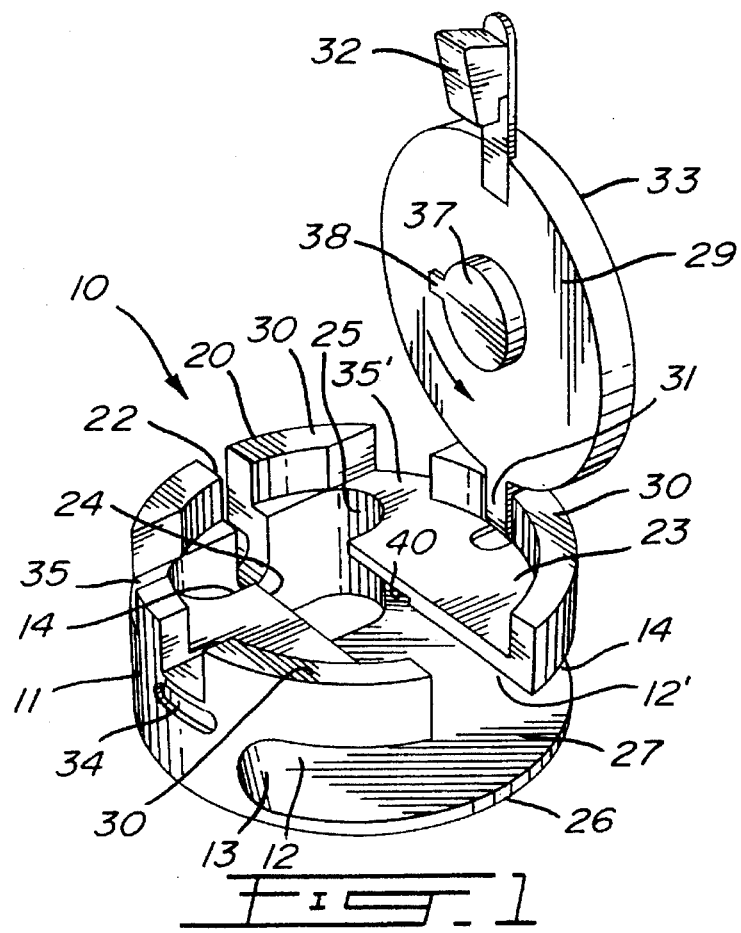
FIG. 1 is a perspective view of the cord retaining and fastening device of the present invention.

Referring now to the drawings, and more particularly to FIGS. 1 to 4, there is shown generally at 10, one example of the cord retaining and fastening device constructed in accordance with the preferred embodiment of the present invention. The device comprises a housing 11 having opposed passages 12 and 12', as better seen in FIG. 2, with the passages each having an inlet end 13 and outlet 14. These passages accommodate the passage of a respective cord-like element section 15 and 15', as better seen in FIG. 4. The cord-like element may be a rope, a lace, a wire or other elongated flexible element of this type.

Figure 2:
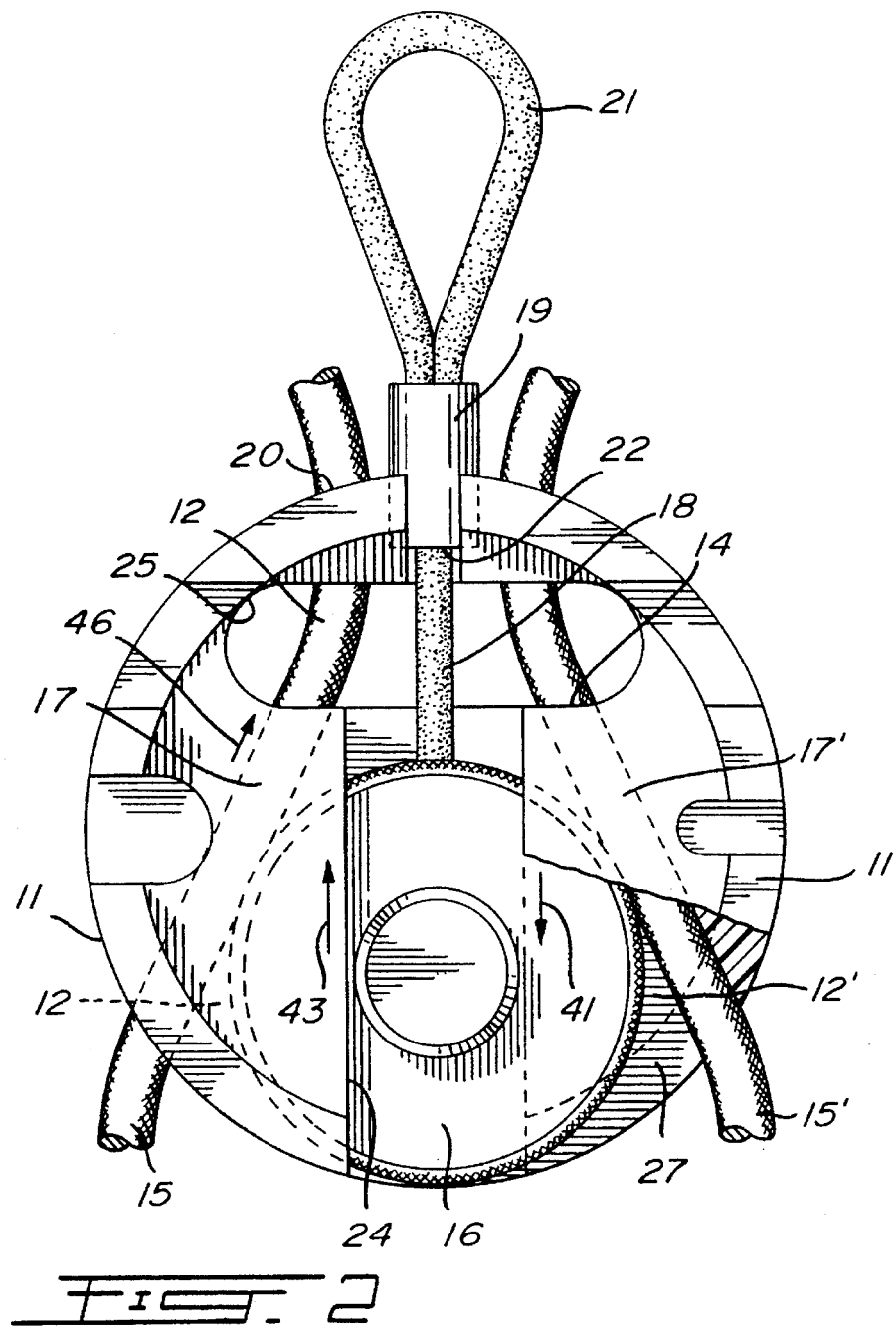
FIG. 2 is a fragmented top view showing the operation of the cord retaining and fastening device of the present invention.
Figure 3:
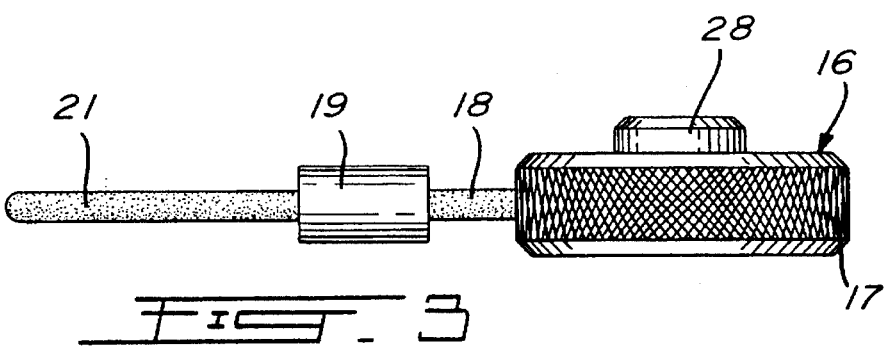
FIG. 3 is a side view of the removable clamping element.

As shown in FIGS. 2 and 3, a clamping element 16 is removably secured in the housing between at least converging sections 17 and 17' of the channels 12 and 12' respectively. The clamping element 16 is provided with a resilient biasing means in the form of an elastic member 18 which is provided with a clamp or arresting element 19 which clamps or secures to an end wall section 20 of the housing 11 to urge the clamping element towards the inlet end 14 of the channels and the converging sections 17 and 17' of the channels 12. A finger-gripping end portion 21 of the elastic element 18 permits the clamping element 16 to be easily installed and secured in position, as shown in FIG. 2, with the elastic member 18 stretched in tension. It also permits ease of removal of the clamp or arresting element 19 by simply pulling it out of engagement with the engaging cavity or slot 22 provided in the end wall section 20.

As can be seen in FIG. 1, the housing is a circular disc-like housing having an intermediate top wall 23 having a transverse guide slot 24 therein. The guide slot 24 is disposed mid-way between the passages 12 and 12' and extends from the inlet end 14 to the outlet end 13. The inlet end 14 of the passages extends to a transverse opening 25 which opens to the rear wall 26 of the housing. The passages 12 and 12' are herein shown as formed as an open-ended slot 27 with opposed converging side walls 12 and 12' and a curved end wall to facilitate the passage of the rope-like elements or cord sections 15 and 15', which are usually of circular cross-section. These passages are also recessed under the intermediate top wall 23.

As shown in FIGS. 2 and 3, the clamping element 16 is in the form of a disc provided with a guide post 28 which extends within the guide slot 24 and displaceable therein to maintain the clamping element centrally disposed between the passages 12 and 12'.

The housing 11, as herein shown, is further provided with a circumferential ridge 30 extending about the intermediate top wall 23. A hinged cover 29 has a hinge element 31 secured to the ridge to one side of the transverse guide slot 24. A latch 32 extends from the peripheral edge 33 of the cover opposite the hinge 31 and engages within a catch 34 provided in the circumferential ridge 30 diametrically opposite the hinge 31.

In the specific application of the cord retaining and fastening device, as shown in FIG. 1, and particularly for the retention and fastening of shoe laces 15 and 15', the circumferential ridge 30 is also provided with opposed openings 35 and 35' which are aligned with one another and disposed adjacent the end wall section 20. The opposed openings 35 and 35' each permit passage of two lace sections therethrough whereby the ends of the laces can be configured in bows 36, as illustrated in FIG. 4.

Figure 4:
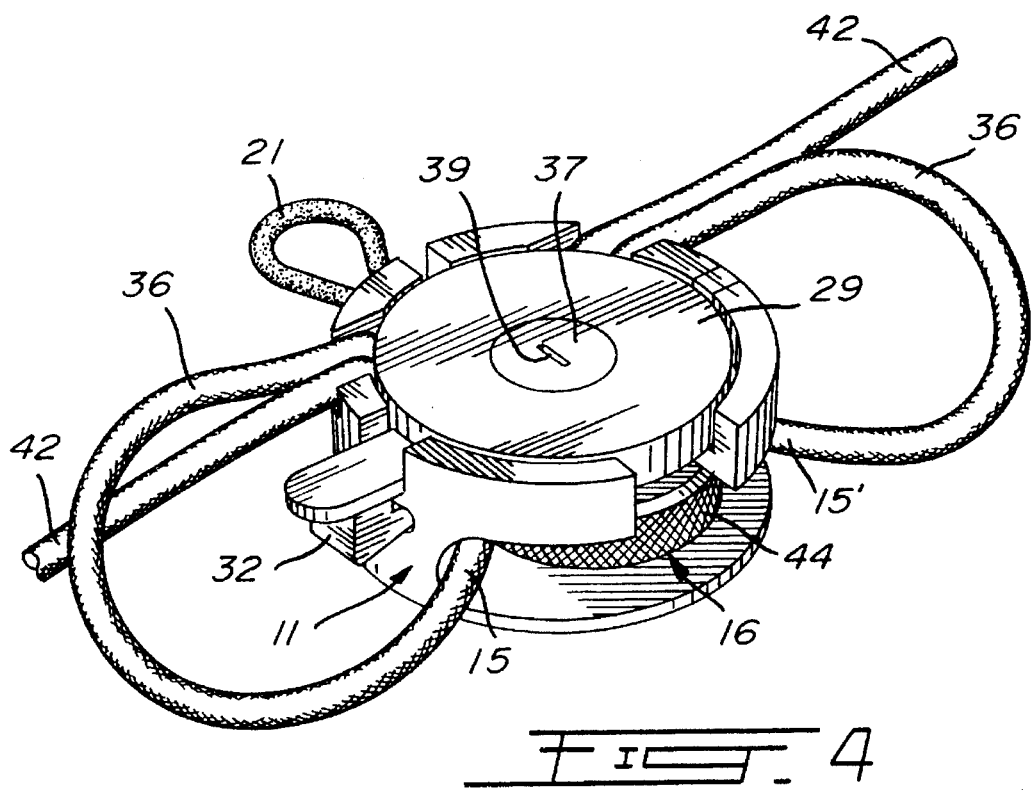
FIG. 4 is a perspective top view showing the cord retaining and fastening device with the cover closed and shown in a shoe lace fastening application.

As can be seen from FIGS. 1 and 4, the cover 29 may also be provided with a lock device 37 having a latch 38 which may be rotated by a key (not shown) inserted in the key hole 39 for the latch to be displaced for engagement under a cut-out section 40 formed in the intermediate top wall 23 adjacent the transverse guide slot 24. Such a fastening device could therefore be used to prevent theft of objects, such as skis or other objects to be secured by a metal wire which can be secured to an immovable object and locked by a key. It is also pointed out that the housing 11 and cover 29 may be fabricated from plastics or metal parts depending on the intended use of the device. The elastic member 18 may be constructed from a variety of elastic products readily available on the marketplace.

The operation of the device will now be described. In order to engage the cord sections 15 and 15' within the housing 11, it is firstly necessary to remove the clamping element 16 therefrom. This is simply done by pulling on the cord end section 21 to disengage the elastic member 18 and arresting element 19 and to then pull the clamping element 16 from the open-ended slot 27 in the direction of arrow 41 (see FIG. 2). The free ends 42 of the pair of cords 15 and 15' (see FIG. 4) are placed through the transverse opening 25, into the open slot 24, and exit from the outlets 13 of the passages. The cords are then pushed into the undercut channels of the open-ended slot 27 under the intermediate top wall to locate within their respective passages 12 and 12'. The clamping element 16 is then reinserted from the end of the open-ended slot 27 and pulled therein by the loop 21 of the elastic member 18 with the elastic member passing through the engaging slot or cavity 22 in the end wall section 20 of the housing. The elastic member is then released and the arresting element 19 abuts against the outer surface of the end wall 20 with the elastic member taut and the clamping element 16 biased forwardly towards the inlet end 14 of the passages 12 and 12', in the direction of arrow 43. The clamping element is further provided with an abraded or gripping circumferential surface 44, as better seen in FIG. 4, to grip the cord sections 15 and 15'. The end wall surfaces of the passages 12 and 12' may also be provided with an abrading surface 13', as shown in FIG. 6, to enhance gripping of the cord sections 15 and 15'.

Accordingly, when the cord sections 12 and 12' are pulled in the direction of arrow 41, either independently or together, they will cause the clamping element 16 to move in the direction of arrow 41 opposed to its clamping direction and cause free passage of the cords. When the cords are released, the clamping element 16 is again urged against the cords to wedge them into the passages under the influence of the elastic member 18. If the cords are pulled in the opposite directions, as shown by arrow 43, they will not be displaced as the clamping element 16 is in wedging engagement with the cords and the pulling of the cord would further cause the clamping element to exert more pressure against the cord and the side wall of the passages 12 and 12'. To remove the cords from the housing, it is again necessary to remove the clamping element 16 or simply push it in the direction of arrow 41 by exerting a pushing action on the guide post 28 in the direction of arrow 41 to free it from its clamping position.

Figure 5:
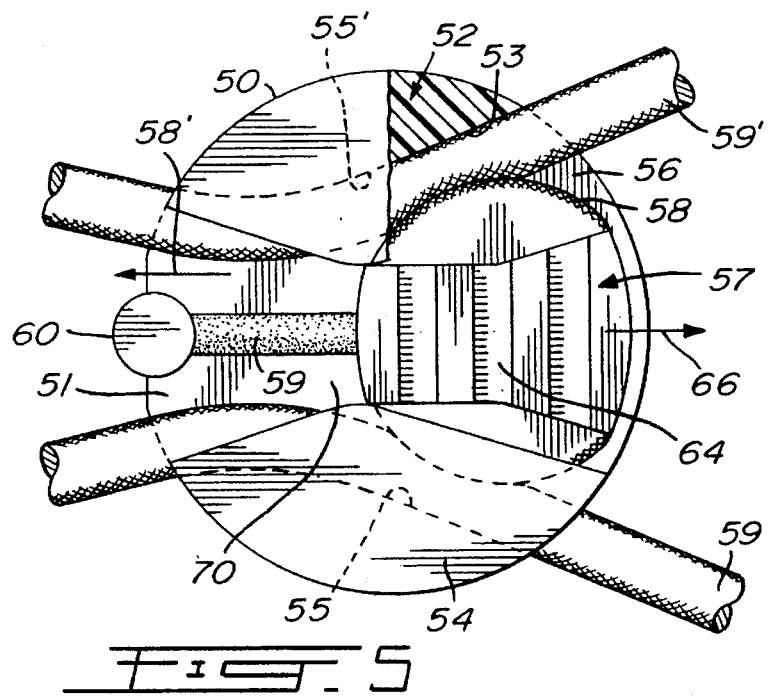
FIG. 5 is a top view of a further example of the cord retaining and fastening device of the present invention.
Figure 6:
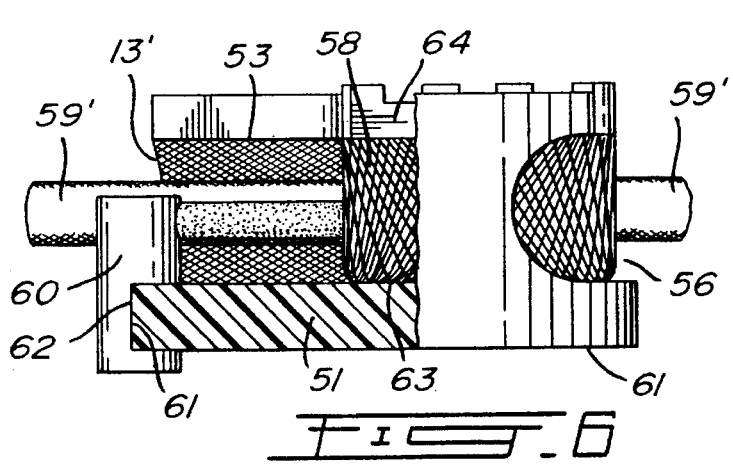
FIG. 6 is a fragmented side view of FIG. 5.
Figure 7:
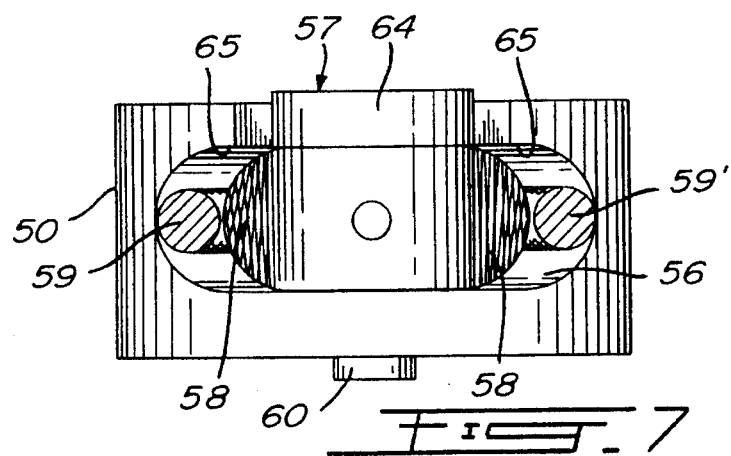
FIG. 7 is an end view of FIG. 5.

Referring now to FIGS. 5 to 7, there is shown a further example of the cord retaining and fastening device constructed in accordance with the present invention. As herein shown, the housing 50 has a flat bottom support wall 51 and wing sections 52 on opposed sides thereof. The wing sections 52 have undercut side walls 53 and a top wall 54. Undercut channels or passages 55 and 55' are thus formed on both sides of the housing 50 and have opposed converging sections extending from the open end 56. A guide slot 70 is formed between the wing sections 52 and leads to the passages 55 and 55'.

A V-shaped wedge element 57 is provided with opposed wedge-shaped side edges 58, having an abrading surface, to wedge the cord sections 59 and 59' in their respective passages 55 and 55' in the manner previously described. The wedge element 57 is also urged in the biasing direction as indicated by arrow 58' by an elastic member 59 having a clamping post 60 secured at a free end thereof. The clamping post 60 is provided with an engaging cavity 61 which clamps in a locating cavity 62' formed in the side edge 62 of the bottom wall 51. The top flat face of the bottom wall provides frictional sliding contact with the flat bottom wall 63 of the wedging element 57.

The wedging element 57 is further provided with a finger engageable top extension 64 to displace the wedge element against its tension force exerted by the elastic member 59 whereby to release the wedge element from clamping engagement with the cord sections 59 and 59'. The shoulder portions 58 of the wedge element 57 extend within the undercut section 65 of the passages, as clearly shown in FIG. 7. With the embodiment herein shown, it can be seen that the wedge element 57 is very easily removable from the open top end housing by simply dislodging the retention post 60 from the end wall of the housing to remove the wedge element. The cord sections are then loaded into the guide slot 70 with each cord 59 and 59' placed in their respective undercut passages and the wedge element 57 is repositioned. The cords are then pulled from the open end 56 until taut and are then prevented from being pulled in the opposite direction, in the direction of arrow 58, due to the wedging action of the wedging element 57.

It is within the ambit of the present invention to cover any obvious modifications of a preferred embodiment, as exemplified herein, provided such modifications fall within the scope of the appended claims.

We claim:

1. A cord retaining and fastening device comprising a housing, opposed passage means in said housing having an inlet and outlet for the passage of two cord sections, a clamping element removably secured in said housing between at least converging open sections of said opposed passage means, resilient biasing means secured to said clamping element for urging same in a direction toward said inlet and said converging open sections of said passage means, means to removably secure said resilient biasing means in said housing, one or both said cord sections when pulled toward said inlet causing said clamping element to further wedge said one or both cord sections between a peripheral portion of said clamping element and a portion of said passage means associated with said one or both said cord sections, said clamping element permitting said one or both cord sections to be freely pulled from said outlet of said passage means, said resilient biasing means being an elastic cord element secured to said clamping element, said elastic element having an attachment means at a free end thereof to connect said elastic element under tension to spring load said clamping element toward said inlet and said converging open sections of said passage means, said clamping element being removable from said housing with said elastic element remaining connected to said housing to provide open access to said opposed passage means to facilitate insertion of said cord section in said inlet and outlet and opposed passage means.

2. A cord retaining and fastening device as claimed in claim 1 wherein said clamping element is provided with a gripping surface in at least wedging sections thereof to grip said one or both cord sections when said one or both cord sections are pulled toward said inlet.

3. A cord retaining and fastening device as claimed in claim 2 wherein said clamping element is shaped for guided displacement in a guide slot defined between said opposed passage means, said passage means being constituted by open-ended spaced converging passages of U-shaped cross-section formed in said housing and having open ends facing one another, said passages converging toward said inlet.

4. A cord retaining and fastening device as claimed in claim 3 wherein said clamping element is provided with opposed shoulder portions for guided displacement between at least a portion of said converging passages.

5. A cord retaining and fastening device as claimed in claim 4 wherein said clamping element is a disc having said gripping surface about a circumferential side edge thereof.

6. A cord retaining and fastening device as claimed in claim 3 wherein said clamping element is provided with guide means for guided engagement in a guide slot provided in said housing to maintain said clamping element displaceable along a straight axis disposed mid-way between said converging passages.

7. A cord retaining and fastening device as claimed in claim 2 wherein said attachment means is an arresting element secured about said elastic element and spaced from said free end thereof, said free end having a finger gripping portion to detach said arresting element from said housing.

8. A cord retaining and fastening device as claimed in claim 7 wherein said arresting element is retained in an undercut slot provided in a side wall section of said housing with said elastic element in a stretched state to bias said clamping element toward said inlet and said converging open sections of said passage means.

9. A cord retaining and fastening device as claimed in claim 8 wherein said inlet of said passage means terminate in a transverse opening disposed between an end wall section of said housing and a rear wall of said housing, said cord sections entering said housing from said rear wall.

10. A cord retaining and fastening device as claimed in claim 9 wherein there is further provided a hinged cover forming a top wall of said housing, said cover having a securement latch for detachable securement thereof to said housing.

11. A cord retaining and fastening device as claimed in claim 10 wherein said outlet of said passage means is provided in an opposite wall section of said housing opposite said end wall section, said passage means being constituted by an open ended slot having opposed converging side walls extending from said opposite wall section to said transverse opening where said side walls are spaced apart, a transverse guide slot in an intermediate top wall of said housing, said clamping element having guide means displaceably retained in said guide slot, said guide slot being disposed mid-way between said opposed converging side walls and extending from said wall section opposite said end wall section to said transverse opening, said outlet of said passages being at said opposite wall section.

12. A cord retaining and fastening device as claimed in claim 11 wherein said housing is a circular disc housing for the attachment of free end portions of shoe laces, there being a circumferential ridge about said intermediate top wall, said hinge cover being engageable between said circumferential ridge, opposed openings in said circumferential ridge aligned with said transverse opening and disposed adjacent said end wall section, said opposed openings each permitting passage of two lace sections therethrough.

13. A cord retaining and fastening device as claimed in claim 2 wherein said attachment means is an arresting element secured at said free end of said elastic element, said arresting element having means to engage same with said housing to maintain said elastic element in a stretched state to bias said clamping element toward said inlet and said converging open sections of said passage means.

14. A cord retaining and fastening device as claimed in claim 1 wherein said housing is a pulley housing for tensioning or supporting cord-like or wire-like members.

* * * * *